United States Patent [19]

Bayense et al.

[11] Patent Number: 6,072,064

[45] Date of Patent: *Jun. 6, 2000

[54] PROCESS FOR THE INTERESTERIFICATION OF TRIGLYCERIDES

[75] Inventors: Cornelis Roeland Bayense, Gameren; Bernard Hendrik Reesink, Doorn; Pieter Hildegardus Berben, Maarn, all of Netherlands

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,238

[22] PCT Filed: Dec. 6, 1994

[86] PCT No.: PCT/NL94/00309

§ 371 Date: Jun. 6, 1996

§ 102(e) Date: Jun. 6, 1996

[87] PCT Pub. No.: WO95/16014

PCT Pub. Date: Jun. 15, 1995

[30] Foreign Application Priority Data

Dec. 7, 1993 [NL] Netherlands ............... 9302126

[51] Int. Cl.$^7$ .............................................. C11C 1/00
[52] U.S. Cl. ................. 554/169; 554/170; 502/150; 502/173
[58] Field of Search ................ 554/170, 169; 502/173, 150

[56] References Cited

FOREIGN PATENT DOCUMENTS 200982   12/1986   European Pat. Off. .

OTHER PUBLICATIONS

Peterson et al., JAOCS, vol. 61, No. 10, p. 1593–97, Oct. 1984.
Bailey's Fat and Oil Products, 5th ed., vol. 1, 1996.
Peterson et al., JAOCS, vol. 61, No. 10, pp. 1593–1597, 1984.

*Primary Examiner*—Deborah D. Carr
*Attorney, Agent, or Firm*—Stephen I. Miller

[57] ABSTRACT

The invention relates to a process for the catalytic interesterification of triglycerides, which is characterized in that a heterogeneous catalyst is used, based on one or more oxides and/or oxysalts of metals of the groups IA and IIA of the Periodic System, at least one of the oxides and/or oxysalts having an optical basicity Λ which is at least 0.5.

15 Claims, No Drawings

PROCESS FOR THE INTERESTERIFICATION OF TRIGLYCERIDES

This application is a 371 of PCT/NL94/00309 filed Dec. 6, 1996.

The present invention relates to a process for the interesterification of fats and oils.

In the preparation of partially hardened fats for use in cooking and frying fat, bread spread, such as margarine, and products having a lower fat content, the starting material used heretofore was oil which was subsequently partially hydrogenated. This hydrogenation was necessary, among other reasons, to obtain the desired melting point of the oil/fat phase, for instance for the purpose of obtaining sufficient spreadability. Hydrogenation can take place utilizing conventional hydrogenation catalysts, such as nickel catalysts.

As consumer awareness of the health hazards of the use of products obtained by hydrogenation grew, so grew the desire to reduce as far as possible the content of transisomers in the unsaturated fatty acids. In the natural products, only the cisisomer occurs, but hydrogenation also involves isomerization, leading to a cis-trans equilibrium. In the normal catalytic hydrogenation of soybean oil to form a product having a content of completely saturated fatty acids of from about 12 to 14%, a transisomer content of about 45% is obtained.

The method for preparing partially saturated fatty acids with a low transisomer content has already been investigated extensively. The first approach consists in adjusting the hydrogenation conditions, whereby hydrogenation is promoted in relation to isomerization by the use of much hydrogen at the surface of the catalyst. This means it is required to work at a low temperature, at a high hydrogen partial pressure and with a proportionally slight amount of catalyst in relation to the amount of component to be hydrogenated. With this method it is possible to obtain a transisomer content of about 10%, the saturated fatty acid content being about 15%. However, this method is commercially little attractive.

A second method for obtaining oils and fats having a low transisomer content is described, for instance, in "Inform, vol. 3, no 11 (November 1992), A. Rozendaal, Interesterification of oils and fats", as well as in EP-A 76682. This method, sometimes referred to as interesterification, is based on the principle that completely hydrogenated triglyceride is mixed with non-hydrogenated triglyceride in a ratio whereby the fatty acid composition of the mixture obtained corresponds with the fatty acid composition of the desired product. Then this mixture is treated with a catalyst which effects a completely random exchange of the fatty acid chains. As catalyst, a homogeneous catalyst based on sodium-methanolate or sodium hydroxide is used.

A disadvantage of the method which is described in the literature mentioned is the catalyst's lack of resistance to water. It is important to dry the feed well because otherwise deactivation of the catalyst arises. There is also a danger of soap formation of free fatty acids not priorly removed, and furthermore, upon completion of the reaction which must typically be conducted in a vacuum, a neutralization of the catalyst should take place, as well as a removal of the catalyst through washing. It should also be noted that a sodium-methanolate is a substance which is difficult to handle, its use on a larger scale being preferably avoided.

The object of the invention is to provide a method for the interesterification of triglycerides which does not possess the above-mentioned disadvantages or does so to an appreciably lesser extent.

The present invention is based on the surprising insight that the interesterification proceeds well when utilizing a heterogeneous catalyst based on one or more oxides and/or oxysalts of metals of the groups IA and IIA of the Periodic System, at least one of the oxides and/or oxysalts having an optical basicity $\Lambda$ which is at least 0.5.

Surprisingly, it has been found that precisely these heterogeneous catalysts are highly suitable for interesterification, it being noted that the reaction rate is too low at lower $\Lambda$-values and, conversely, undesired by-products may be formed at too high $\Lambda$-values. Accordingly, $\Lambda$ preferably does not exceed 1.5, and optimum results can be achieved at an $\Lambda$ of from 0.5 to 0.9.

The optical basicity ($\Lambda$) is defined, for instance, in W. W. Porterfield, Inorganic Chemistry, Addison-Wesley Publishing Company, Inc, Reading, Mass., 1984, pp. 318–321. In this publication it is indicated that the basicity can be calculated on the basis of Table 6.7 as included in that publication, utilizing the basicity moderating parameters $\gamma$. This basicity is related to the $pK_a$ value determined in aqueous solution and to the electronegativity of cations in solid oxidic compounds, respectively.

The notion 'heterogeneous' is used in the context of the present invention to indicate that the catalyst or the catalytically active material does not dissolve or substantially does not dissolve in the reaction medium.

In the process according to the invention, as heterogeneous catalyst, oxides and/or oxysalts of elements of the Groups IA and IIA of the Periodic System of the Elements are used. In this connection the definition of oxysalts is understood to include the solid hydroxides of the elements mentioned. Examples of suitable materials are the oxides of lithium, sodium, potassium, rubidium, cesium, magnesium, calcium, strontium and barium, as well as the hydroxides, carbonates, phosphates and silicates thereof.

Suitable active components according to the invention are, in particular, alkali metal oxides, alkaline earth metal oxides and alkali metal carbonates.

According to a preferred embodiment of the invention, a combination is used of two or more components in the catalyst, which components each satisfy the requirement of a minimum value of the optical basicity of 0.5. The reason is that such combinations can exhibit a synergy with regard to the activity for the interesterification. Surprisingly, it has further been found that a very specific combination of components, viz. the combination of MgO with an alkali metal carbonate exhibits a strong synergy. The ratio of the components in the combination can vary within wide limits. Suitable amounts lie between 10 and 75% by weight of alkali metal carbonate calculated with respect to the weight of the combination of MgO with alkali metal carbonate.

According to the invention, supported catalysts can also be used, the oxides and/or oxysalts being provided on a suitable support. In that case a support is used which is preferably substantially inert to the reaction. In this connection, the support is defined in terms of its conventional meaning in catalysis, i.e. as a material which is inert to the interesterification reaction, which means that the material does not affect the activity and selectivity, apart from the indirect influence of the support, such as the better dispersion of the active component. Suitable supports are inter alia silicon oxide, aluminum oxide, zirconium oxide, titanium oxide, as well as combinations of two or more of such supports.

Optionally, the materials to be used may advantageously be given a pretreatment to remove water from the material. Such a pretreatment preferably comprises heating under dry air or an inert gas.

In general, the catalysts used according to the invention can be prepared in a known manner, for instance by precipitation of the active component or by impregnation of a preformed support. Other current preparation techniques can be used as well. In the preparation, the nature of the reactor should be taken into account, i.e. for use in a fixed bed a different particle size and a different particle size distribution are required than for a reaction in slurry phase. In the latter case, the catalyst should possess good filtration properties. A person of ordinary skill in the art is familiar with the properties which such catalysts must satisfy, so that the conditions of preparation can be adjusted accordingly.

It has been found that the provision of well divided active material, that is, having the proper basicity, on a likewise active oxide, for instance on MgO, leads to catalysts with which good results can be obtained.

For practicing the process according to the invention, a person of ordinary skill in the art can make use of current methods for esterification, preferably in the absence of a solvent. The reaction can be performed batchwise or continuously, in the equipment conventional for the purpose.

According to a preferred embodiment of the invention, the reaction is performed continuously, preferably in a fixed bed of catalyst particles. This reaction can be carried out at atmospheric pressure, which is a clear advantage over the known methods as far as they work at reduced pressure. The temperature is preferably between 100 and 250° C., while the residence time, which depends on the reaction conditions, is generally between 15 minutes and 10 hours.

The amount of catalyst to be used in the case of a slurry phase application generally lies between 0.02 and 25% by weight based on the starting materials. When using a fixed bed of catalyst particles, the relation between the residence time and the amount of catalyst used can be appropriately expressed as LHSV (Liquid Hourly Space Velocity), which is preferably between 0.1 and 10 $h^{-1}$.

In general, the catalyst is preferably supplied in the form of particles incorporated in a matrix, for instance of fat. The form of these particles is determined by the method of production, for instance spraying or flaking, respectively yielding drop-shaped particles and flakes.

The invention also relates to a catalyst which is suitable for use in the present process. In a first embodiment, this catalyst is characterized in that it is based on one or more oxides and/or oxysalts of metals of the groups IA and IIA of the Periodic System, which catalyst is substantially insoluble in triglycerides, at least one of the oxides and/or oxysalts having an optical basicity Λ which is at least 0.5, which catalyst is incorporated into a suitable matrix, preferably of fat. The catalyst concentration is preferably from 1 to 75% by weight, preferably from 15 to 50% by weight, based on the weight of the catalyst and the matrix.

In a second embodiment, the catalyst is characterized in that it is based on a combination of MgO and an alkali metal carbonate, which combination can, if desired, be incorporated in a suitable matrix, for instance of fat.

The invention will now be elucidated in and by a few examples without being limited thereto. Prior to the actual examples, the preparation of a number of catalysts is described.

Preparation of Catalyst 1

5.6 g potassium carbonate was dissolved in 65 ml water. With the aid of this solution an incipient wetness impregnation was performed on 50 g γ-$Al_2O_3$. The thus prepared catalyst was dried in vacuo at 80° C. for 2 hours and then in air at 120° C. for 16 hours. Calcination of the material was carried out in air at 500° C. for 2 hours. After calcination, 11 g of the catalyst was mixed in a nitrogen atmosphere with 44 g of molten hardened soybean fat. The whole was then cooled and flaked.

Based on the data of Porterfield, the optical basicity Λ of potassium carbonate is:

$$1 - \left[\frac{(2)}{6} * \left(1 - \frac{1}{0.73}\right) + \frac{(4)}{6} * \left(1 - \frac{1}{3,04}\right)\right] = 0.68$$

Preparation of Catalyst 2

A solution consisting of 65 ml water and 9.6 g potassium hydroxide was used for the incipient wetness impregnation of 50 g γ-$Al_2O_3$. Based on the data according to Porterfield, the optical basicity of potassium hydroxide is 0.88. The product of this impregnation was dried in vacuo at 80° C. for 2 hours and then in air at 120° C. for 16 hours. Calcination of the catalyst was performed in nitrogen at 500° C. for 2 hours. After calcination, a part of the catalyst was processed to form flakes, according to the procedure described for catalyst 1.

Preparation of Catalyst 3

Potassium carbonate (12.6 g) was dissolved in 60 ml water. With the aid of this solution an incipient wetness impregnation was performed on 50 g MgO (Λ=0.78). The catalyst was dried overnight at room temperature and then at 110° C. for 16 hours. Calcination of the material was carried out in air at 500° C. for 2 hours. After calcination, a part of the catalyst was processed to form flakes, according to the procedure described for catalyst 1.

Preparation of Catalyst 4

A solution of potassium hydroxide (13.5 g) in water (60 ml) was used for the incipient wetness impregnation of 50 g MgO. The so prepared product was dried in vacuo at 70° C. for 2 hours and then at 110° C. for 16 hours. Calcination of the catalyst was carried out in air at 500° C. for 2 hours. Then a part of the calcined material was flaked in hardened soybean fat, according to the procedure described for catalyst 1.

Preparation of Catalyst 5

Cesium carbonate (15.0 g, Λ=0.78) was dissolved in 65 ml water, and with the aid of this solution an incipient wetness impregnation was then performed on 50 g γ-$Al_2O_3$. The product of this impregnation was dried in vacuo at 80° C. for 2 hours and then in air at 120° C. for 16 hours. Calcination of the catalyst was carried out in air at 500° C. (2 hours), whereafter 11 g of the material was processed in a nitrogen atmosphere to form flakes according to the procedure described for catalyst 1.

Slurry Phase Interesterification

EXAMPLE 1

An autoclave was filled with a mixture consisting of 375 g liquid soybean oil (IV=130) and 85 g hydrogenated soybean oil (iodine value lower than 2). The initial mixture has a 'dropping point' of 53.7° C. (AOCS method Cc 18-80; heating rate 0.5° C./min). Then 50 g of the flakes of the $K_2CO_3$/$Al_2O_3$ catalyst (catalyst 1) was added.

The autoclave was heated with stirring to a reaction temperature of 225° C., the commencement of heating being defined as the starting time (0 minutes). After 6 hours' reaction, the dropping point of the triglyceride mixture was 37.2° C. The acid value of the product was found to be 1.50 mg KOH/g.

EXAMPLES 2–5

50 g flakes of the catalysts 2–5 were tested in slurry phase interesterification experiments, according to the abovedescribed procedure (Example 1). Depending on the activity of the catalysts, different reaction times were used. The dropping points (d.p.) of the products (° C.), as well as the acid values (a.v.) of the triglyceride mixtures after the reaction are summarized in the table.

TABLE

Interesterification of triglycerides over heterogeneous basic catalysts

| Example | Catalyst | Reaction time (min) | Final d.p. (°C.) | Final a.v. (mg KOH/g) |
|---------|----------|---------------------|------------------|-----------------------|
| 1 | 1 | 300 | 37.2 | 1.50 |
| 2 | 2 | 300 | 40.3 | 0.82 |
| 3 | 3 | 60 | 37.5 | 0.52 |
| 4 | 4 | 300 | 38.3 | 0.99 |
| 5 | 5 | 360 | 36.8 | 1.76 |

($T_r$ = 225° C.; d.p. = dropping point; a.v. = acid value).

Fixed Bed Interesterification

EXAMPLE 6

$Al_2O_3$ extrusions (Engelhard Al-4193E 1/32") were impregnated with 23% by weight $K_2CO_3$ utilizing incipient wetness impregnation. A tube reactor was filled with 50 cm³ of this $K_2CO_3/Al_2O_3$ catalyst, diluted with 50 cm³ Engelhard Al-4196E 1/32" extrusions. The reactor was heated to 225° C., whereafter a feed was pumped over the catalyst bed, consisting of 75% liquid soybean oil and 25% hardened soybean oil having an iodine value lower than 2. The initial dropping point was 53.7° C. The reaction was carried out downflow (trickle flow) at atmospheric pressure. After some time an equilibrium was attained where the dropping point of the product mixture had a constant value of 48° C. After raising the temperature to 250° C., a dropping point of 38° C. was measured for the product triglyceride mixture.

We claim:

1. A process for the catalytic interesterification of triglycerides, characterized in that a mixture of completely hydrogenated triglycerides and non-hydrogenated triglycerides is treated with a heterogeneous catalyst comprising one or more oxides and/or oxy salts of metals of the groups IA and IIA of the Periodic System, at least one of the oxides and/or oxysalts having an optical basicity Λ which is at least 0.5 and recovering a mixture of triglycerides having randomized hydrogenated and non-hydrogenated fatty acid chains.

2. A process according to claim 1 wherein the catalyst is incorporated into a matrix of fat.

3. A process according to claim 1, wherein the optical basicity Λ is between 0.5 and 1.5.

4. A process according to claim 1 wherein the optical basicity Λ is between 0.5 and 0.9.

5. A process according to claims 1, 3 or 4 characterized in that the heterogeneous catalyst comprises two or more materials chosen from among oxides and oxysalts.

6. A process according to claims 1, 3 or 4 characterized in that the heterogeneous catalyst comprises two or more oxysalts.

7. A process according to claim 5, wherein the catalyst is based on a combination of magnesium oxide and an oxysalt.

8. A process according to claim 1, characterized in that said oxysalt comprises a carbonate or mixtures of carbonates.

9. A process according to claim 8, wherein said oxysalt is chosen from potassium carbonate and sodium carbonate.

10. A process according to claim 1, wherein the reaction is performed continuously.

11. A process according to claim 1, wherein the interesterification is performed in a fixed bed of catalyst particles.

12. A process according to claim 1, wherein the reaction is performed at atmospheric pressure.

13. A process according to claim 1, wherein the reaction is carried out without prior removal of fatty acids and/or water from the starting material.

14. A catalyst suitable for use in the process according to claim 1 consisting of one or more materials selected from among the oxides and oxysalts of the metals of the groups IA and IIA of the Periodic System, which catalyst is substantially insoluble in triglycerides, at least one of the said materials having an optical basicity Λ which is at least 0.5, which catalyst is in the form of particles incorporated into a matrix, of fat.

15. The catalyst according to claim 14 which is based on a combination of magnesium oxide and an alkali metal carbonate.

* * * * *